US007190254B2

(12) United States Patent
Ogihara et al.

(10) Patent No.: US 7,190,254 B2
(45) Date of Patent: Mar. 13, 2007

(54) EMIGRANT RECEPTION SYSTEM, EMIGRANT GATE SYSTEM, EMIGRANT CONTROL SYSTEM, EMIGRANT CONTROL METHOD, PASSPORT APPLICANT INFORMATION MANAGEMENT METHOD, LAYOUT OF EMIGRANT GATE, IMMIGRANT RECEPTION SYSTEM, IMMIGRANT GATE SYSTEM, IMMIGRANT CONTROL SYSTEM, IMMIGRANT CONTROL METHOD, LAYOUT OF IMMIGRANT GATE SYSTEM, AND PASSPORT

(75) Inventors: Masaki Ogihara, Yokohama (JP); Ryo Imura, Takorozawa (JP); Yasuhiko Mizuno, Sakura (JP)

(73) Assignee: Hitachi, Ltd., Tokyo (JP)

( * ) Notice: Subject to any disclaimer, the term of this patent is extended or adjusted under 35 U.S.C. 154(b) by 80 days.

(21) Appl. No.: 10/217,438

(22) Filed: Aug. 14, 2002

(65) Prior Publication Data

US 2003/0107472 A1 Jun. 12, 2003

(30) Foreign Application Priority Data

Dec. 7, 2001 (JP) ............................ 2001-374210

(51) Int. Cl.
*G05B 19/00* (2006.01)

(52) U.S. Cl. .................. 340/5.53; 340/5.52; 340/5.51; 340/5.1; 235/384; 235/382; 235/492; 235/375

(58) Field of Classification Search ............... 340/5.53, 340/5.52, 5.1, 5.2, 5.51; 235/384, 382, 492, 235/375

See application file for complete search history.

(56) References Cited

U.S. PATENT DOCUMENTS

| | | | | |
|---|---|---|---|---|
| 6,085,976 | A * | 7/2000 | Sehr | 235/384 |
| 6,266,129 | B1 | 7/2001 | Uzawa et al. | |
| 6,698,653 | B1 * | 3/2004 | Diamond et al. | 235/375 |

FOREIGN PATENT DOCUMENTS

| | | |
|---|---|---|
| EP | 1102216 | 5/2001 |
| JP | 535935 | 2/1993 |
| JP | A-5-35935 | 2/1993 |
| JP | A-10-157352 | 6/1998 |
| TW | 3733393 | 11/1998 |
| WO | 9606409 | 2/1996 |
| WO | 0028485 | 5/2000 |

* cited by examiner

*Primary Examiner*—Brian Zimmerman
*Assistant Examiner*—Vernal Brown
(74) *Attorney, Agent, or Firm*—Mattingly, Stanger, Malur & Brundidge, P.C.

(57) ABSTRACT

In an emigration control method, information on a passport-issue-allowed person and image data for specifying the person are stored in a storage. Image data for specifying a person who owns the passport to be inspected by an emigration inspection and information for specifying the passport-issue-allowed person are received. The passport-holding-person specifying image data is stored into an emigrant information storage in correspondence with the passport-issue-allowed person specifying information The passport-issue-allowed person specifying image data, the passport-issue-allowed person information, and the passport-holding-person specifying image data are extracted based upon the received passport-issue-allowed person specifying information.

4 Claims, 11 Drawing Sheets

FIG. 3

116

310 320

| ID NUMBER | PASSPORT-HOLDING-PERSON INFORMATION | | | | | | | | |
|---|---|---|---|---|---|---|---|---|---|
| | PASSPORT NUMBER | NATIONALITY | NAME | SEX | BIRTH DATE | PASSPORT ISSUING DATE | VALIDITY-TERM EXPIRATION DATE | FACE PHOTOGRAPH DATA (REGISTRATION) | NEGATIVE DATA |
| 1000001 | MN3589812 | JAPAN | TARO TANAKA | M | 1971.05.08 | 1994.01.06 | 1999.01.06 | ··· | ··· |
| 1000002 | MN4598715 | JAPAN | MICHIKO YAMADA | F | 1965.10.22 | 1991.08.15 | 1996.08.15 | ··· | ··· |
| 1000003 | AM4657983 | USA | RICARD JANSEN | M | 1958.03.14 | 1997.10.22 | 2002.10.22 | ··· | ··· |
| | | | | | | | | | |
| | 321 | 322 | 323 | 324 | 325 | 326 | 327 | 328 | 329 |

FIG. 4

INFORMATION ON EMIGRANTS WHO DEPART BY FLIGHT "B" OF AIRLINE "A" ON MM/DD/YY

117

410 420

| ID NUMBER | INFORMATION ON EMIGRANTS | | | | | | | | | |
|---|---|---|---|---|---|---|---|---|---|---|
| | PASSPORT NUMBER | NATIONALITY | NAME | SEX | BIRTH DATE | PASSPORT ISSUING DATE | VALIDITY-TERM EXPIRATION DATE | FACE PHOTOGRAPH DATA (EMIGRATION CONTROL) | LANE NUMBER | INSPECTION RESULT |
| 1000001 | MN3589812 | JAPAN | TARO TANAKA | M | 1971.05.08 | 1994.01.06 | 1999.01.06 | ... | A1 | ○ |
| 1000003 | AM4657983 | USA | RICARD JANSEN | M | 1958.03.14 | 1997.10.22 | 2002.10.22 | ... | A3 | ○ |
| | | | | | | | | | | |
| | | | | | | | | | | |

421 422 423 424 425 426 427 428 429 430

FIG. 11

INFORMATION ON IMMIGRANTS WHO ARRIVE BY FLIGHT "B" OF AIRLINE "A" ON MM/DD/YY

217

| ID NUMBER (610) | IMMIGRANT INFORMATION (620) | | | | | | | | | | |
|---|---|---|---|---|---|---|---|---|---|---|---|
| | PASSPORT NUMBER (621) | NATIONALITY (622) | NAME (623) | SEX (624) | BIRTH DATE (625) | PASSPORT ISSUING DATE (626) | VALIDITY-TERM EXPIRATION DATE (627) | FACE PHOTOGRAPH DATA (EMIGRATION CONTROL) (628) | FACE PHOTOGRAPH DATA (IMMIGRATION CONTROL) (629) | LANE NUMBER (630) | IMMIGRATION CONTROL RESULT (631) |
| 1000001 | MN3589812 | JAPAN | TARO TANAKA | M | 1971. 05.08 | 1994.01.06 | 1999.01.06 | ... | ... | B3 | ○ |
| 1000003 | AM4657983 | USA | RICARD JANSEN | M | 1958. 03.14 | 1997.10.22 | 2002.10.22 | ... | ... | B2 | ○ |
| | | | | | | | | | | | |
| | | | | | | | | | | | |

ARRIVAL FLIGHT INFORMATION ON MM/DD/YY

216

| FLIGHT NUMBER (910) | DEPARTURE AIRPORT ID (920) | ARRIVAL TIME (930) |
|---|---|---|
| JL0360 | JPN10 | 10:00 |
| AL0153 | ITY03 | 10:30 |
| | | |
| | | |

EMIGRANT RECEPTION SYSTEM, EMIGRANT GATE SYSTEM, EMIGRANT CONTROL SYSTEM, EMIGRANT CONTROL METHOD, PASSPORT APPLICANT INFORMATION MANAGEMENT METHOD, LAYOUT OF EMIGRANT GATE, IMMIGRANT RECEPTION SYSTEM, IMMIGRANT GATE SYSTEM, IMMIGRANT CONTROL SYSTEM, IMMIGRANT CONTROL METHOD, LAYOUT OF IMMIGRANT GATE SYSTEM, AND PASSPORT

BACKGROUND OF THE INVENTION

1. Field of the Invention

The present invention relates to an emigrant reception system, an emigrant gate system, an emigrant control system, an emigrant control method, a passport applicant information management method, a layout of emigrant gate, an immigrant reception system, an immigrant gate system, an immigrant control system, an immigrant control method, a layout of immigrant gate system, and a passport.

2. Description of the Related Art

Various technical ideas capable of automatically managing emigration/immigration operations have been developed, while emigration/immigration management systems have been carried out in airports and ports where international air flights/steamer services are available. For instance, JP-A-5-35935 and JP-A-10-157352 describe emigration/immigration managing techniques.

This Japanese patent laid-open application JP-A-5-35935 basically discloses the stand-alone type emigration/immigration managing system in which when the actual emigration/immigration control (inspection) operations are carried out, the image data of the face photograph stored in the IC type passport is read out. This read image data is identified, or matched with the image data of the face photograph which is photographed at this place, and then legitimacy of the person who owns the passport is judged based upon such a judging element as to whether or not this read image data can be made coincident with the photographed image data. Also, this emigration/immigration managing system is arranged in such a manner that the various sorts of information such as the data as to illegal emigrant/immigrant can be downloaded via the communication network.

Also, in the information managing system described in the above-described JP-A-10-157352, when the actual emigration/immigration control (inspection) operations are carried out, this information managing system is connected via the communication network to the domestic/foreign passport managing systems so as to download the various finger print information which have been registered in these passport managing systems. Then, the downloaded finger print information is identified, or matched with the finger information stored in the IC card type passport, and then legitimacy of the person who owns this IC card type passport is judged based upon such a judging element as to whether or not this stored finger print information can be made coincident with the downloaded finger print information.

As previously described, in the above-explained conventional techniques, these prior art systems cannot quickly execute the emigration/immigration control operations in higher efficiencies. In other words, every time each of travelers is inspected by the emigration/immigration control operations, respectively, the information managing system must be connected via the communication network to the domestic/foreign passport managing systems in order to download the finger information, which necessarily requires lengthy communication time. When the communication time required to emigrate/immigrate each of these travelers is accumulated, a large amount of such communication time becomes useless under which delays occurred in the emigration/immigration control operations cannot be solved.

Also, as to an immigrant who takes an arrival flight, such information which has been acquired during an emigration control operation cannot be utilized during an immigration control operation. As a result, these conventional systems can hardly prevent illegal immigrations.

The present invention has been made to solve the above-described problems, and therefore, has an object to provide such a technique capable of realizing quick emigration/immigration control (inspection) operations in a higher efficiency, while illegal immigrations can be furthermore prevented.

SUMMARY OF THE INVENTION

An emigration reception system, according to an aspect of the present invention, is featured by such an emigration reception system connected to an emigration control (inspection) system capable of judging as to whether or not emigration of a person who owns a passport is allowed, comprising: a reading apparatus for reading specific information as to a passport-issue-allowed person from the passport, while the passport is equipped with a storage portion which stores thereinto at least the passport-issue-allowed person specifying information; a photographing apparatus for photographing an image which specifies the person who owns the passport so as to acquire person specifying image data; and an apparatus for outputting both the read passport-issue-allowed person specifying information and the acquired person specifying image data to the emigration control system.

An emigration gate system, according to another aspect of the present invention, is featured by such an emigration gate system connected to an emigration control (inspection) system capable of judging as to whether or not emigration of a person who owns a passport is allowed, comprising: a reading apparatus for reading specific information as to a passport-issue-allowed person from the passport, while the passport is equipped with a storage portion which stores thereinto at least the passport-issue-allowed person specifying information; an apparatus for outputting the passport-issue-allowed-person specifying information to the emigration control system; an apparatus for inputting thereinto a judgment result of allowing/not allowing the emigration which is supplied from the emigration control system; and an apparatus for allowing, or not allowing that the person who owns the passport passes through a gate in response to the acquired judgement result.

An emigration control system, according to another aspect of the present invention, is featured by such an emigration control system comprising: a passport-issue-allowed person information storage apparatus for storing thereinto both information related to a passport-issue-allowed person and image data for specifying the passport-issue-allowed person, which are supplied from an external passport issuing institution via a communication network; an apparatus for inputting both image data for specifying a person who owns the passport and should be inspected by an emigration control, and information for specifying the passport-issue-allowed person; an emigrant information storage apparatus for storing thereinto the image data for specifying the passport holding person in correspondence with the passport-issue-allowed person specifying information; an apparatus for extracting both the passport-issue-allowed person specifying information and said passport-issue-allowed person information, which are stored in the passport-issue-allowed person information storage apparatus, and also the passport-holding-person specifying image data stored in the emigrant information apparatus based upon the inputted passport-issue-allowed person specifying information; an apparatus for identifying the passport-issue-allowed person specifying image data with respect to the passport-holding-person specifying image data; an apparatus for judging legitimacy of the passport-issue-allowed person information stored in the emigrant information storage apparatus; and an emigration allowing/not-allowing apparatus for judging as to whether or not the emigration of the passport-holding-person is allowed based upon a result of the identification and a result of the legitimacy judgment.

An emigration control method, according to another aspect of the present invention, is featured by such an emigration control method applied to an emigration control system comprising a passport-issue-allowed person information storage apparatus for storing thereinto both information related to a passport-issue-allowed person and image data of specifying the passport-issue-allowed person, wherein: both image data for specifying a person who owns the passport and should be inspected by an emigration inspection, and information for specifying the passport-issue-allowed person are inputted; the passport-holding-person specifying image data is stored into an emigrant information storage apparatus in correspondence with the passport-issue-allowed person specifying information; both the passport-issue-allowed person specifying image data and the passport-issue-allowed person information, which are stored in the passport-issue-allowed person information storage apparatus, and also, the passport-holding-person specifying image data stored in the emigrant information storage apparatus are extracted based upon the inputted passport-issue-allowed person specifying information; the passport-issue-allowed person specifying image data is identified with the passport-holding-person specifying image data; legitimacy of the passport-issue-allowed person information stored in the emigrant information storage apparatus is judged; and a judgment is made as to whether or not the emigration of the passport-holding-person is allowed in response to a result of the identification and a result of the legitimacy judgment.

A method of managing the above-described passport-issue-allowed person information in the emigration control method, according to another aspect of the present invention, is featured by such a method of managing passport-issue-allowed person information utilized in an emigration control method applied to an emigration control system comprising a passport-issue-allowed person information storage apparatus for storing thereinto both the passport-issue-allowed person information and image data of specifying the passport-issue-allowed person, wherein: the emigration control method is realized by that: both image data for specifying a person who owns the passport and should be inspected by an emigration inspection, and information for specifying the passport-issue-allowed person are inputted; the passport-holding-person specifying image data is stored into an emigrant information storage apparatus in correspondence with the passport-issue-allowed person specifying information; both the passport-issue-allowed person specifying image data and the passport-issue-allowed person information, which are stored in the passport-issue-allowed person information storage apparatus, and also, the passport-holding-person specifying image data stored in the emigrant information storage apparatus are extracted based upon the inputted passport-issue-allowed person specifying information; the passport-issue-allowed person specifying image data is identified with the passport-holding-person specifying image data; legitimacy of the passport-issue-allowed person information stored in the emigrant information storage apparatus is judged; and a judgment is made as to whether or not the emigration of the passport-holding-person is allowed in response to a result of the identification and a result of the legitimacy judgment; and wherein: both information related to a passport-issue-allowed person and image data for specifying the passport-issue-allowed person are supplied from an external passport issuing institution via a communication network to the passport-issue-allowed person information storage apparatus.

A layout of an emigration gate system, according to another aspect of the present invention, is featured by such a layout of an emigration gate system arranged on an emigration control lane through which a person who owns a passport, wherein: a gate which is opened/closed in response to an instruction issued from an emigration control (inspection) system for judging as to whether or not emigration is allowed is provided behind both a first passport information reading apparatus for reading out passport-issue-allowed-person specifying information from the passport equipped with a storage portion for storing thereinto the passport-issue-allowed-person specifying information, and also a person specifying image data acquiring apparatus for photographing an image which specifies a person who owns the passport so as to acquire person specifying image data; both a second passport information reading apparatus for reading out passport-issue-allowed-person specifying information from the passport equipped with a storage portion for storing thereinto the passport-issue-allowed-person specifying information, and also an emigration gating apparatus for allowing, or not allowing that the person who owns the passport passes through the gating apparatus in response to the judgment result acquired from the emigration control system are arranged behind a place where the person who owns the passport passes through the gate.

An immigration reception system, according to another aspect of the present invention, is featured by such an immigration reception system connected to an immigration control (inspection) system capable of judging as to whether or not an immigration of a person who owns a passport is allowed, comprising: a reading apparatus for reading specific information as to a passport-issue-allowed person from the passport, while the passport is equipped with a storage portion which stores thereinto at least the passport-issue-allowed person specifying information; a photographing apparatus for photographing an image which specifies the person who owns the passport so as to acquire person specifying image data; and an apparatus for outputting both the read passport-issue-allowed person specifying information and the acquired person specifying image data to the immigration control system.

An immigration gate system, according to another aspect of the present invention, is featured by such an immigration gate system equipped with an emigration reception system connected to an immigration control (inspection) system capable of judging as to whether or not an immigration of a person who owns a passport is allowed, wherein the immigration reception system is comprised of: a reading apparatus for reading specific information as to a passport-issue-allowed person from the passport, while the passport is equipped with a storage portion which stores thereinto at least the passport-issue-allowed-person specifying information; a photographing apparatus for photographing an image which specifies the person who owns the passport so as to acquire person specifying image data; and an apparatus for outputting both the read passport-issue-allowed person specifying information and the acquired person specifying image data to the immigration control system, and wherein: the immigration reception system is comprised of: an apparatus for reading the passport-issue-allowed-person specifying information from the passport; an apparatus for acquiring a judgment result of allowing/not-allowing the immigration from the immigration control system; and an apparatus capable of allowing, or not allowing that the person who owns the passport passes through the gate in response to the judgment result acquired from the immigration allowing/not-allowing judgment result acquiring apparatus.

An immigration control system, according to another aspect of the present invention, is featured by such an immigration control (inspection) system comprising: an immigrant information storage apparatus for storing thereinto both information related to a passport-issue-allowed person of an immigrant and image data for specifying the immigrant in correspondence with information for specifying the passport-issue-allowed person; an apparatus for entering both image data for specifying a person who owns the passport which should receive an immigration-inspection and information for specifying the passport-issue-allowed person so as to be stored into the immigrant information storage apparatus; an apparatus for extracting the immigrant specifying image data, the passport-holding-person specifying image data, and the passport-issue-allowed person information stored in the immigrant information storage apparatus based upon the entered passport-issue-allowed person specifying information; an apparatus for identifying the immigrant specifying image data with respect to the passport-holding-person specifying image data; an apparatus for judging legitimacy of the passport-issue-allowed person information; and an apparatus for judging as to whether or not the immigration of the passport-holding-person is allowed based upon a result of the identification and a result of the legitimacy judgment.

An immigration control method, according to another aspect of the present invention, is featured by such an immigration control method applied to an immigration control system comprising an immigrant information storage apparatus for storing thereinto both information related to a passport-issue-allowed person of an immigrant and image data for specifying the immigrant in correspondence with information for specifying the passport-issue-allowed person; wherein: both image data for specifying a person who owns the passport which should receive an immigration-inspection and information for specifying the passport-issue-allowed person are entered so as to be stored into the immigrant information storage apparatus; the immigrant specifying image data, the passport-holding-person specifying image data, and the passport-issue-allowed person information stored in the immigrant information storage apparatus are extracted based upon the entered passport-issue-allowed-person specifying information; the passport-issue-allowed person specifying image data is identified with respect to the passport-holding-person specifying image data; legitimacy of the passport-issue-allowed person information is judged; and a judgment is made as to whether or not the immigration of the passport-holding-person is allowed based upon a result of the identification and a result of the legitimacy judgment.

A layout of an immigration gate system, according to a further aspect of the present invention, is featured by such a layout of an immigration gate system arranged on an immigration control lane through which a person who owns a passport, wherein: a gate which is opened/closed in response to an instruction issued from an emigration control (inspection) system for judging as to whether or not emigration is allowed is provided behind both a passport information reading apparatus for reading out passport-issue-allowed person specifying information from the passport equipped with a storage portion for storing thereinto the passport-issue-allowed person specifying information, and also a person specifying image data acquiring apparatus for photographing an image which specifies a person who owns the passport so as to acquire person specifying image data; both a passport information reading apparatus for reading out passport-issue-allowed person specifying information from the passport and also a gate apparatus for allowing, or not allowing that the person who owns the passport passes through the gate in response to the judgment result acquired from the immigration control system are arranged behind a place where the person who owns the passport passes through the gate.

A passport, according to a still further aspect of the present invention, is featured by such a passport which is used in any one of the above-described emigration control method, the method for managing the passport-issue-allowed person information in the emigration control, and the immigration control method, the passport is equipped with a storage portion for storing thereinto information for specifying the passport-issue-allowed person; and the passport-issue-allowed-person specifying information corresponds to ID information specific to the passport-issue-allowed person.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram for illustratively showing a database structure of a passport owner information DB according to an embodiment of the present invention.

FIG. 4 is a diagram for illustratively indicating a database structure of an emigrant information DB according to an embodiment of the present invention.

FIG. 11 is a diagram for illustratively indicating a database structure of an immigrant information DB according to an embodiment of the present invention.

DETAILED DESCRIPTION OF THE INVENTION

Figure 1:
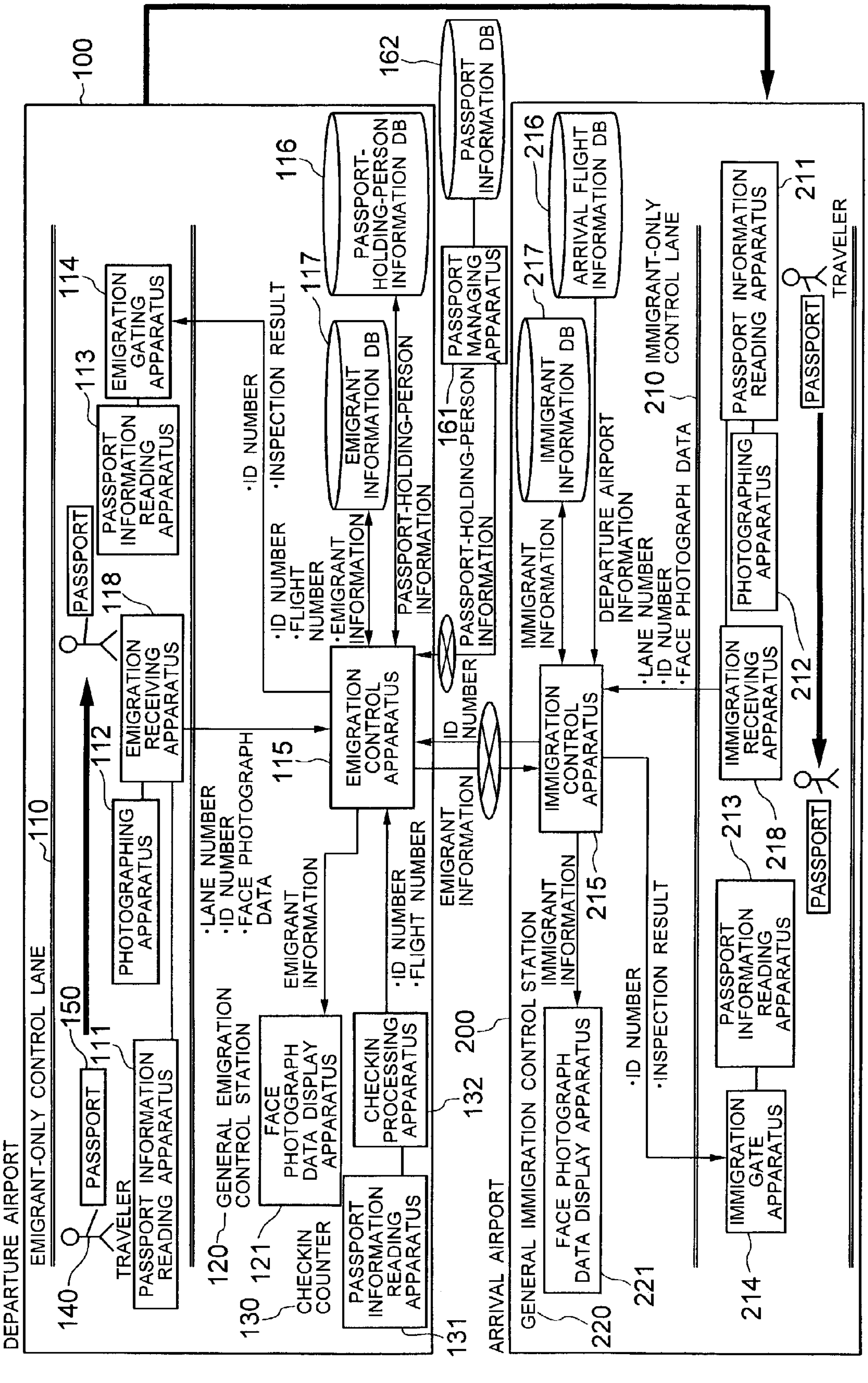
FIG. 1 is a schematic block diagram for indicating an entire arrangement of an emigration/immigration system related to emigration/immigration controls, according to an embodiment of the present invention, for example, executed in an airport.

A description will now be made of a technique capable of an emigration/immigration management according to an embodiment of the present invention. FIG. 1 is a block diagram for schematically showing an entire arrangement of emigration/immigration system executed in an airport, according to this embodiment of the present invention. As shown in this drawing, according to this embodiment, the emigration/immigration system is mainly subdivided into three different sub-systems, namely, an emigration control-series (inspection) system, an immigration control-series (inspection) system, and a passport management system. The emigration control-series (inspection) system is arranged by various sorts of electronic appliances installed on the side of a departure airport 100. The immigration control (inspection) system is arranged by various sorts of electronic appliances installed on the side of an arrival airport 200. The passport management system is controlled by a passport issuing person (governmental institutions and external passport issuing institutions). These three subsystems are connected in a proper manner via a preselected communication line and a communication network (will be simply referred to as a “network” hereinafter). It should be understood that the passport management system may be arranged by employing a passport managing apparatus 161 and a passport information DB (database) 162.

Figure 2:
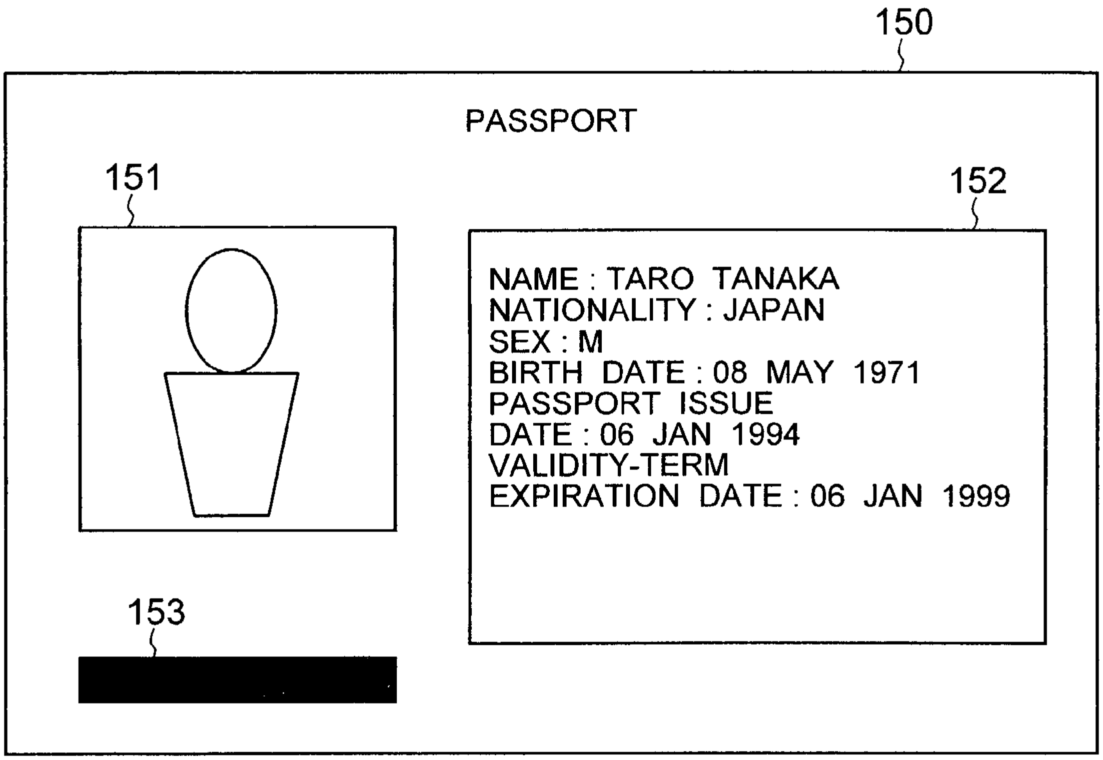
FIG. 2 is a conceptional diagram for representing a structure of an example of a passport according to an embodiment of the present invention.

A first explanation is made as to process operations of handling a passport of a traveler and also information used when the passport is issued. As is well known, passport issuing institutions located in various places in Japan may issue passports in response to requests issued from travelers. FIG. 2 is a conceptional view for indicating one example of a major portion of a passport. As shown this drawing, a face photograph (passport owner’s identification photograph) 151, a description item 152, and a storage medium (storage portion) 153 are provided in a passport 150. The face photograph 151 attached on the passport 150 was photographed when the passport 150 was issued. On the description item 152, a name, a nationality, a sex, a birth date, and a validity expiration date are described as traveler information. The storage medium 153 is a non-volatile memory which is constructed of, for example, an EEPROM and a ROM, which stores thereinto information. That is, an ID (identification) number specified to a person who owns legitimacy of issuing a passport is stored into this storage medium 153. Alternatively, this ID number may contain information as to a nationality.

After each of these passport issuing institutions has issued the passport 150 to the traveler, this passport issuing institution transmits the description item 152 as passport owner information to the passport management system by relating this description item 152 with respect to an ID number stored in the storage medium 153. As indicated in FIG. 1, the passport managing apparatus 161 employed in the passport management system stores the received passport owner information to the passport information DB 162. As explained above, the passport owner information stored in the passport information DB 162 is stored into a passport owner information DB 116 in a periodic manner via the network through the passport managing apparatus 161 and an emigration control apparatus 115 of FIG. 1. In this case, a database structure of this passport owner information DB 116 will now be explained. That is, as shown in FIG. 3, the passport owner information DB 116 contains passport owner information 320 in correspondence with the above-described ID number stored in the passport. As respective items which constitute this passport owner information 320, there are provided a passport number 321, a nationality 322, a name 323, a sex 324, a birth date 325. an issuing date 326 of the passport, a validity expiration date 327 of the passport, image data 328 of a face photograph photographed when the passport was issued, and negative data 329. It should be noted that this negative data indicates histories as to illegal emigration/immigration and illegal stays.

Referring to FIG. 1, emigration control (inspection) operation will now be described. In each departure airport 100, the above-explained emigration control-series system is installed. This emigration control-series system corresponds to an aggregate structure of various sub-systems which play various roles and own various functions. Although these subsystems are not segmented in FIG. 1, this aggregate structure is equipped with a checkin system, an emigration reception system, an emigration gate system, a face-photograph data display system, and an emigration control system. The respective systems may be properly arranged by utilizing such an information process system as a computer. In the following explanation, the emigration control-series system may be called the emigration control system.

First, the checkin system containing a passport information reading apparatus (passport information reading means) 131 and a checkin processing apparatus 132 is installed on a checkin counter 130 (will be discussed more in detail). The passport information reading apparatus 131 is connected to the checkin processing apparatus 132. This checkin processing apparatus 132 is connected to the above-described emigration control system. Also, an emigration reception system containing a passport information recording apparatus 111, a photographing apparatus 112, and an emigration receiving apparatus 118 is installed on the entrance side of an emigrant-only control lane 110 (will be explained more in detail). Both the passport information reading apparatus 111 and the photographing apparatus 112 are connected to the emigration receiving apparatus 118. This emigration receiving apparatus 118 is connected to the above-described emigration control system. Furthermore, an emigrant gate system containing another passport information reading apparatus 113 and an emigrant gating apparatus 114 is installed on the exit side of the emigrant-only control lane 110 (will be discussed more in detail). The passport information reading apparatus 113 is connected to the emigrant gating apparatus 114. This emigrant gating apparatus 114 is connected to the above-described emigration control system.

Figure 7:
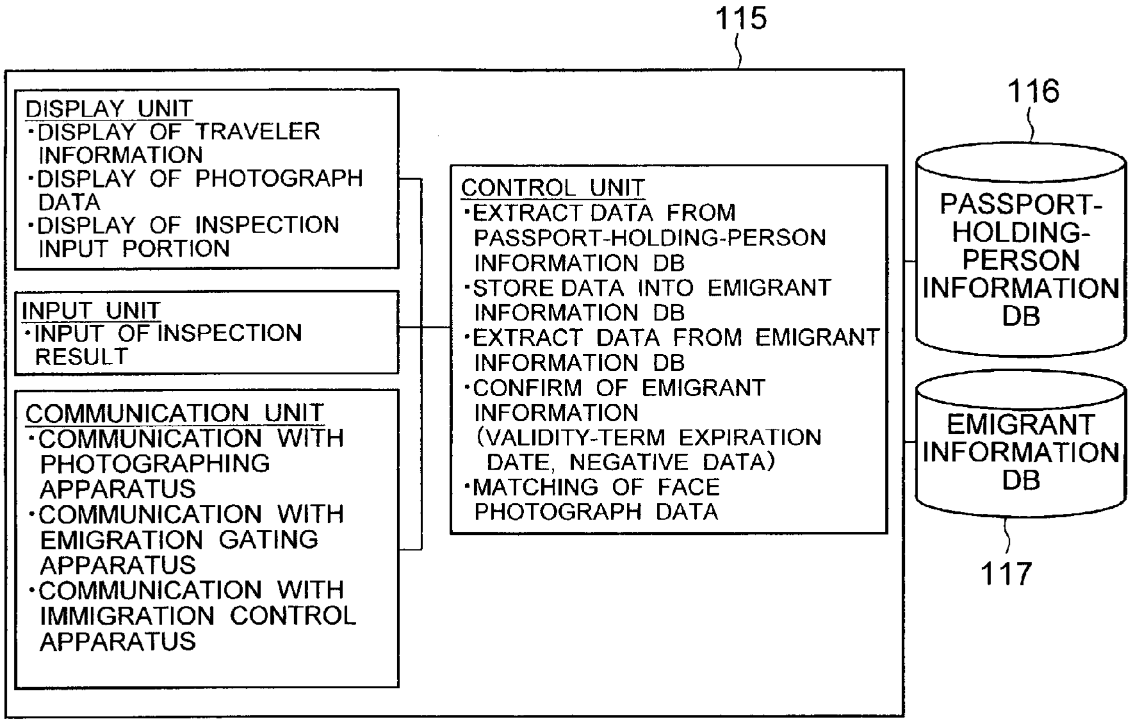
FIG. 7 is a block diagram for schematically indicating an arrangement of an emigration control apparatus according to an embodiment of the present invention.

Moreover, a face-photograph data display system having the face-photograph data display apparatus 121 is installed in a general emigration control station 120 (will be described more in detail). This face-photograph data display apparatus 121 is connected to the above-described emigration control system. Then, the emigration control system is connected to the above-described various sub-systems, and may own a hub (central) function capable of transmitting/receiving various sorts of information, and also contains the emigration control apparatus 115, the emigrant information DB (database) 117, and the passport owner information DB (database) 116. As shown in FIG. 7, this emigration control apparatus 115 is constituted by a control unit, a display unit, an input unit, and a communication unit, and further is additionally provided with the passport owner information DB 116, and the immigrant information DB 117. The control unit extracts data from the passport owner information DB 116, stores data into the emigrant information DB 117, extracts data from the emigrant information DB 117, confirms traveler information (validity term expiration date, and negative data), and also identifies face photograph data. The display unit displays thereon the traveler information, photograph data, and an inspection input portion. The input unit inputs an inspection result. The communication unit is communicated with the emigration receiving apparatus 118, with the emigration gating apparatus 114, and with an immigration control apparatus 215. It should also be noted that an immigration control apparatus 215 (will be described) owns a similar structure and a similar function.

Next, concrete operations of the above-described respective apparatus will now be explained by describing actions (activity) of a traveler until emigration inspection (emigration control) is carried out. First, a checkin process operation is carried out. As indicated in FIG. 1, a traveler 140 performs a checkin process operation at a checkin counter 130 of an airline which is used by this traveler 140 and is located in the departure airport 100. First, a checkin processing apparatus 132 corresponds to an apparatus known in the art, which uses a magnetic card reading machine well known in this technical field. The checkin processing apparatus 132 reads airline information such as flight numbers, which is described on a flight ticket owned by the traveler 140, and then, stores the read airline information into a known storage apparatus additionally provided with this checkin processing apparatus 132. The passport information reading apparatus 131 reads necessary information such as an ID number from the storage medium 153 of the passport 150, and then transmits the read necessary information to the checkin processing apparatus 132. This checkin processing apparatus 132 receives the ID number from the passport information receiving apparatus 131, and transmits the received ID number to the emigration control apparatus 115 in correspondence with the previously-stored flight number. The emigration control apparatus 115 stores the received ID number into a relevant flight number file of the emigrant information DB 117. In this case, a database structure of this emigrant information DB 117 is shown in FIG. 4. As indicated in this drawing, the emigrant information DB 117 owns emigrant information 420 in correspondence with an ID number 410. As respective items which constitute this emigrant information 420, there are provided: a passport number 421, a nationality 422, a name 423, a sex 424, a birth data 425, a passport issuing date 426, a passport validity-term expiration date 427, image data 428 of a face photograph which was photographed when emigration was accepted, a number 428 of an emigrant-only control lane, and a result of an emigration control.

Figure 5:
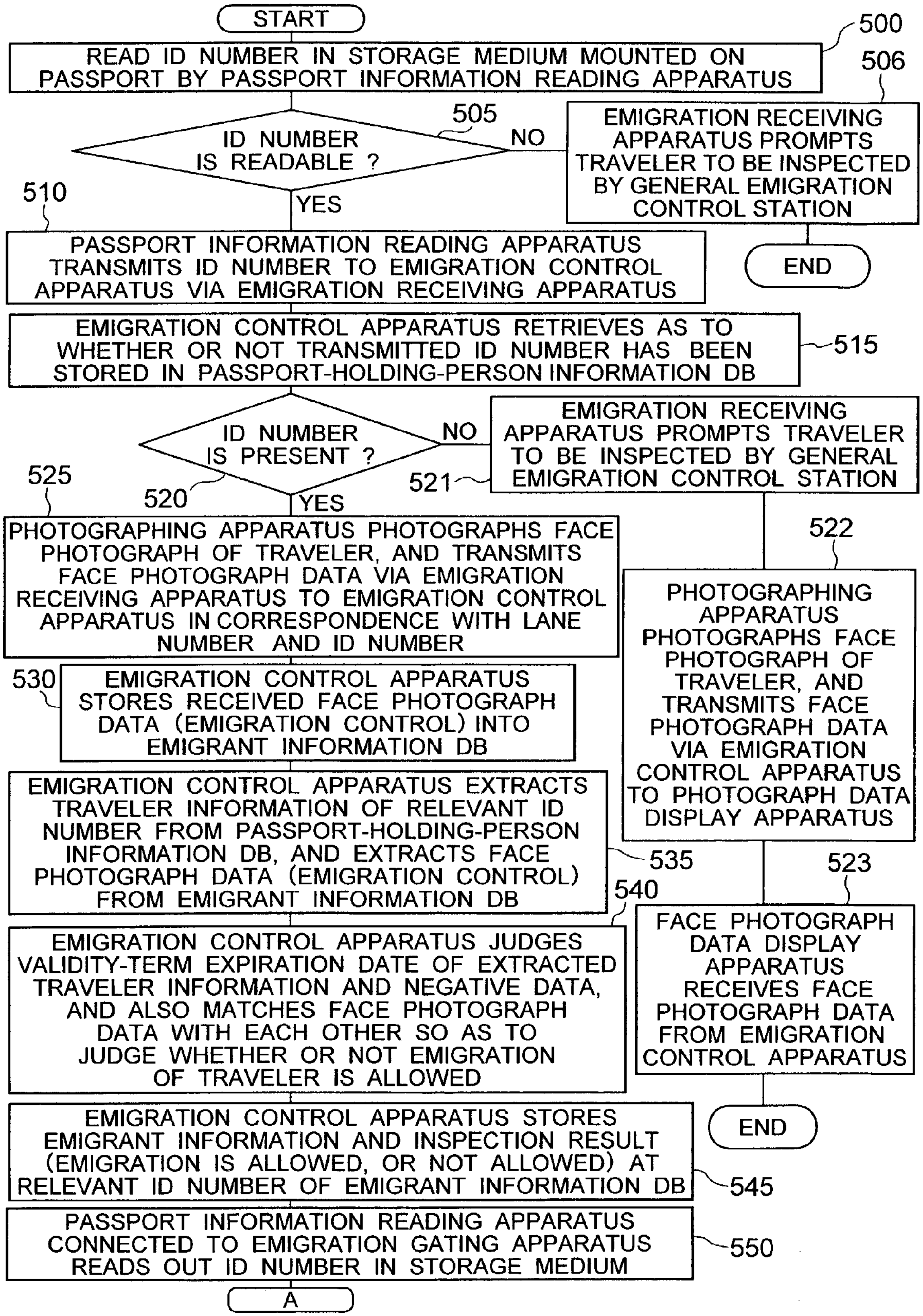
FIG. 5 is a flow chart for describing a front half flow operation of an emigration control process operation according to an embodiment of the present invention.
Figure 6:
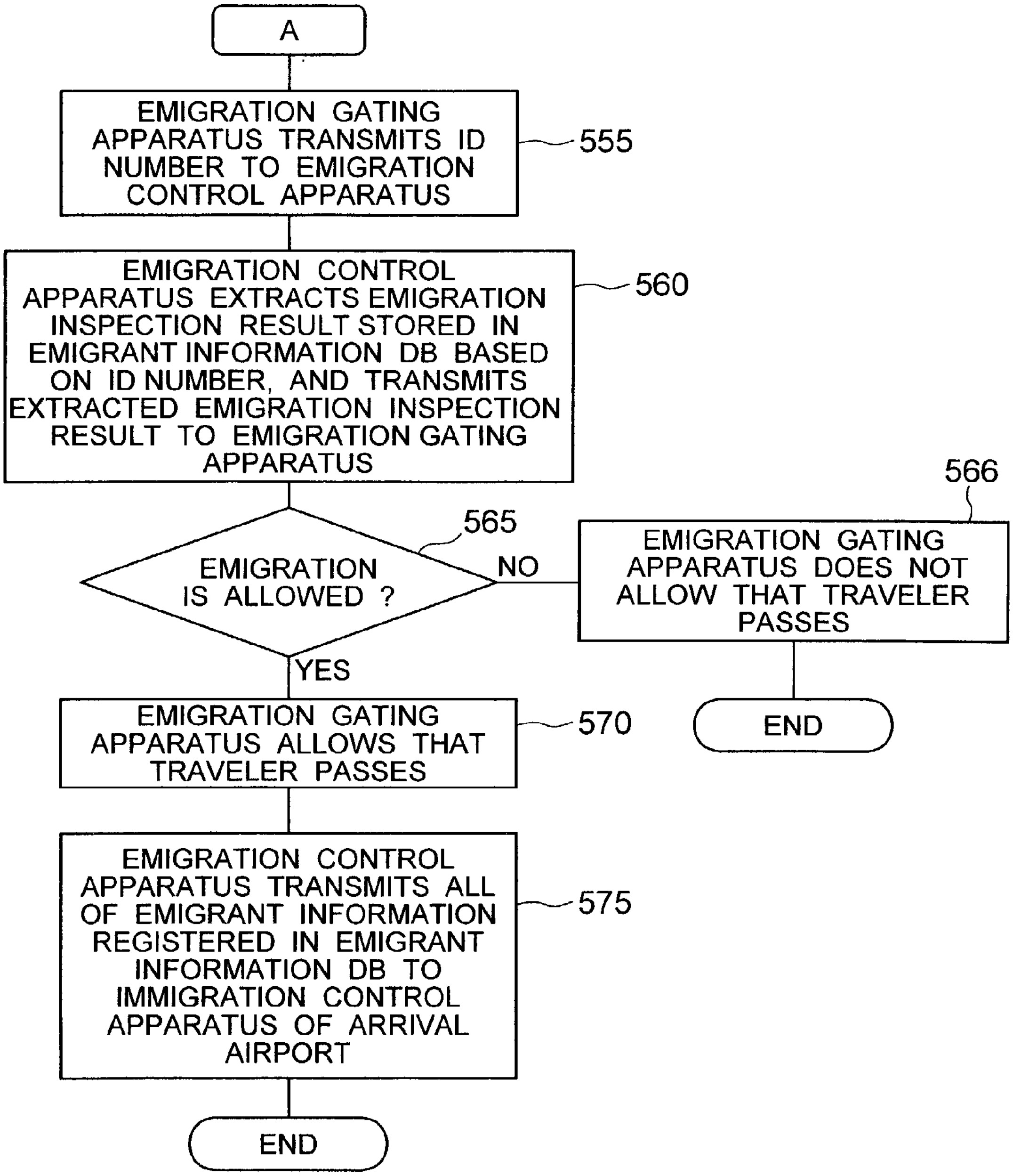
FIG. 6 is another flow chart for explaining a rear half flow operation of the emigration control process operation according to the embodiment of the present invention.

Next, an emigration control process operation as to the traveler 140 in an emigrant-only control lane 110 will now be explained with reference to flow charts shown in FIG. 5 and FIG. 6, and the block diagram of FIG. 1, and further, both the passport owner information DB of FIG. 3 and the emigrant information DB of FIG. 4, if necessary.

Figures 12, 13:
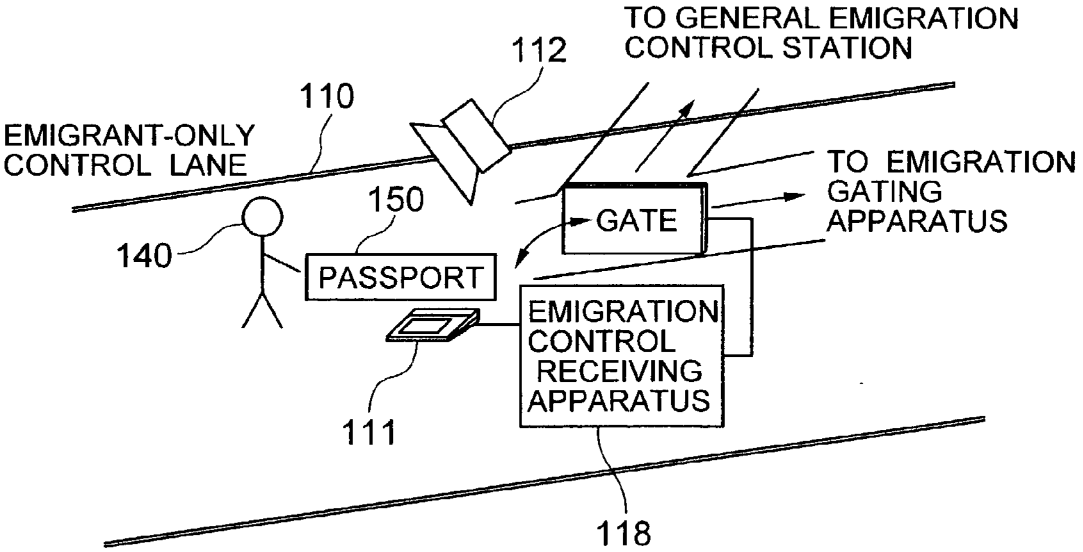
FIG. 12 is a diagram for illustratively showing a database structure of an arrival flight information DB according to an embodiment of the present invention.
FIG. 13 is a diagram for illustratively representing an emigration reception image in an emigrant-only control lane according to an embodiment of the present invention.

First, the traveler 140 inserts the passport 150 into the passport information reading apparatus 111, or holds up this passport 150 to the passport information reading apparatus 111 on the emigrant-only control lane 110 of the passport 150 after the checkin process operation is completed. As a result, the passport information reading apparatus 111 reads out an ID number of the storage medium 153 mounted on the passport 150 (step 500). The condition of this reading operation is represented in FIG. 13. This drawing indicates a gate and arrangements of the respective apparatus used in the emigration reception on the emigrant-only control lane 110. When the ID number of the storage medium 153 cannot be read ("NO" in step 505), the emigration receiving apparatus 118 receives a notification from the passport information reading apparatus 111, and closes the gate, and then prompts the traveler 140 to go to the general emigration control station 120 (step 506). To the contrary, when the ID number can be read ("YES" in step 505), the emigration receiving apparatus 118 transmits the read ID number to the emigration control apparatus 115 (step 510). This emigration control apparatus 115 retrieves to confirm as to whether or not the transmitted ID number has been stored in the passport owner information DB 116 (step 515).

In the case that the ID number has not been stored in this passport owner information DB 116 ("NO" in step 520), the emigration receiving apparatus 118 receives a notification from the emigration control apparatus 115, and closes the gate, and then prompts the traveler 140 to go to the general emigration control station 120 (step 521). Furthermore, the photographing apparatus 112 photographs a face of the traveler 140, and then, transmits this image data (namely, face photograph data) to the emigration receiving apparatus 118. This emigration receiving apparatus 118 transmits the received face photograph data to the face photograph data display apparatus 121 of the general emigration control station 120 (step 522). The face photograph data display apparatus 121 displays the face photograph data received in a step 523 on a display unit in order that an emigration controller inspects this face photograph data.

On the other hand, in the case that the ID number has been stored in the passport owner information DB 116 ("YES" in step 520), the photographing apparatus 112 photographs a face of the traveler 140, and then, transmits the face photograph data to the emigration receiving apparatus 118 in correspondence with this ID number. The emigration receiving apparatus 118 transmits both the face photograph data and the ID number received from the photographing apparatus 112 (step 525). The emigration control apparatus 115 stores both the received ID number and the received face photograph data into an ID number 410 and the face photograph data (emigration control) 428 of the emigrant information DB 117 (step 530). Subsequently, the emigration control apparatus 115 extracts passport owner information 320 of this relevant ID number 310 from the passport owner information DB 116, and also extracts the face photograph data (emigration control) 428 of this ID number 410 from the emigrant information DB 117 (step 535). The emigration control apparatus 115 executes a judging process operation of the validity-term expiration date 327 and the negative data 329 of the extracted traveler information 320, and also executes a matching process operation as to both the face photograph data (registered) 328 and the face photograph data (emigration control) 428 by utilizing an image recognition, and thus, judges as to whether or not the emigration of the traveler 140 is allowed (step 540).

Figure 8:
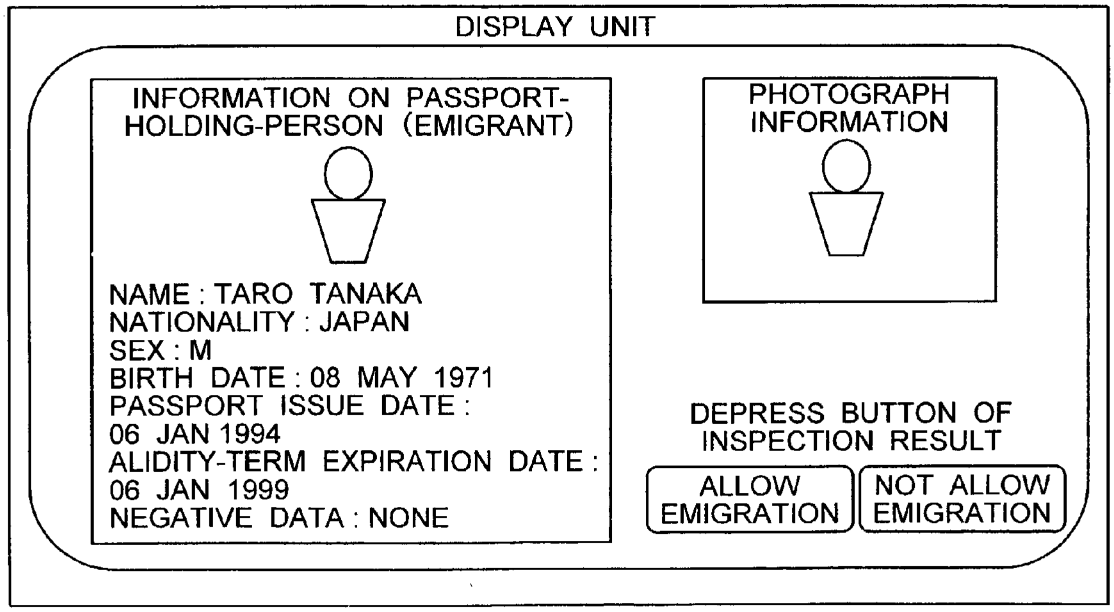
FIG. 8 is a diagram for illustratively showing both a screen image of a display unit of the emigration control apparatus and a screen image of a display unit of an immigration control apparatus, according to an embodiment of the present invention.

At this time, in such a case that the matching process operation of the face photograph data can be technically difficult by using the image recognition, since both the face photograph data (registered) and the face photograph data (emigration control) are displayed on the display unit of the emigration control apparatus 115 as represented by the screen image of FIG. 8, the emigration controller may artificially execute the face-photograph matching operation to enter a result of this artificial matching process operation. The emigration control apparatus 115 stores both the emigrant information 420 and an emigration control result 430 other than the face photograph data (emigration control) 428 at this ID number 410 of the emigrant information DB 17 (step 545). The traveler 140 advances to the emigrant-only control lane 110, and then stops his walking at the emigration gate apparatus 114. The traveler 140 inserts the passport 150 into the passport information reading apparatus 113, or holds up this passport 150 to the passport information reading apparatus 113 which is connected to the emigration gating apparatus 114. As a result, the passport information reading apparatus 113 reads out the ID number of the storage medium 153 of the passport 150 (step 550). Subsequently, as indicated in the flow chart of FIG. 6, the emigration gating apparatus 114 transmits the read ID number to the emigration control apparatus 115 (step 555). The emigration control apparatus 115 extracts the emigration control result 430 stored in the emigrant information DB 117 from the transmitted ID number, and then, transmits the extracted emigration control result 430 to the emigration gating apparatus 114 (step 560). If the emigration of this traveler 140 is not allowed ("NO" in step 565), then the emigration gating apparatus 114 does not allow that this traveler 140 passes through this emigration gating apparatus 114 (step 566). To the contrary, in the case that the emigration of this traveler 140 is allowed ("YES" in step 565), then the emigration gating apparatus 114 allows that this traveler 140 can pass through the emigration gating apparatus 114 (step 570). After a series of the above-described emigration process operations has been carried out with respect to all of the travelers 140 who use the same airline flight, the emigration control apparatus 115 transmits all of the information as to the ID numbers 410 and the emigrant information 420, which have been stored n the emigrant information DB 117, in a batch manner to the immigration control apparatus 215 of the arrival airport 200 (step 575).

Referring to FIG. 1, immigration control (inspection) operation will now be described. In each arrival airport 200, the above-explained immigration control-series system is installed. This immigration control-series system corresponds to an aggregate structure of various sub-systems which play various roles and own various functions. Although these subsystems are not segmented in FIG. 1, this aggregate structure is equipped with an immigration reception system, an immigration gate system, a face-photograph data display system, and an immigration control system. The respective sub-systems may be properly arranged by utilizing such an information process system as a computer.

First, an immigration reception system containing a passport information receiving apparatus 211, a photographing apparatus 212, and an immigration receiving apparatus 128 is installed on the entrance side of an immigrant-only control lane 210 (will be explained more in detail). Both the passport information reading apparatus 211 and the photographing apparatus 212 are connected to the immigration receiving apparatus 218. This immigration receiving apparatus 218 is connected to the above-described immigration control-series system. Furthermore, an immigration gate system containing another passport information reading apparatus 213 and an immigrant gating apparatus 214 is installed on the exit side of the immigrant-only control lane 210. The passport information reading apparatus 213 is connected to the immigrant gating apparatus 214. This immigrant gating apparatus 214 is connected to the above-described immigration control-series system. Moreover, a face-photograph data display system having the face-photograph data display apparatus 221 is installed in a general immigration control station 220 (will be described more in detail). This face-photograph data display apparatus 221 is connected to the above-described immigration control-series system. Then, the immigration control-series system is connected to the above-described various sub-systems, and may own a hub (central) function capable of transmitting/receiving various sorts of information, and also contains the immigration control apparatus 215, the immigrant information DB (database) 217, and an arrival flight information DB (database) 216. As represented in FIG. 7, this immigration control apparatus 215 owns a similar arrangement and a similar function to those of the above-explained emigration control apparatus 115. In other words, the immigration control apparatus 215 is arranged by a control unit, a display unit, an input unit, and a communication unit, and is additionally provided with the arrival flight information DB 216, and the immigrant information DB 217, as shown in FIG. 1. The control unit extracts data from the arrival flight information DB 216, stores data into the immigrant information DB 217, extracts data from the immigrant information DB 217, confirms traveler information (validity-term expiration date, and negative data), and also performs a matching process operation of face photograph data. The display unit displays thereon the traveler information, photograph data, and an inspection input portion. The input unit inputs an inspection result. The communication unit is communicated with the immigration receiving apparatus 118, with the immigration gating apparatus 214, and with an immigration control apparatus 215.

In this case, a description will now be made of both a database structure of the arrival flight information DB 216 and another database structure of the immigrant information DB 217. As shown in FIG. 12, the arrival flight information DB 216 owns departure time 920 and arrival time 930 with respect to a name of arrival flight 910. As represented in FIG. 11, the immigrant information DB 217 owns immigrant information 620 in correspondence with an ID number 610. As respective items which constitute this immigrant information 620, there are provided: a passport number 621, a nationality 622, a name 623, a sex 624, a birth date 625, a passport issuing data 626, a passport validity-term expiration date 627, image data 628 of a face photograph which was photographed with emigration was accepted, image data 629 of a face photograph which was photographed when immigration was accepted, an immigrant-only control lane number 630, and a result of an emigration control 631.

Figure 9:
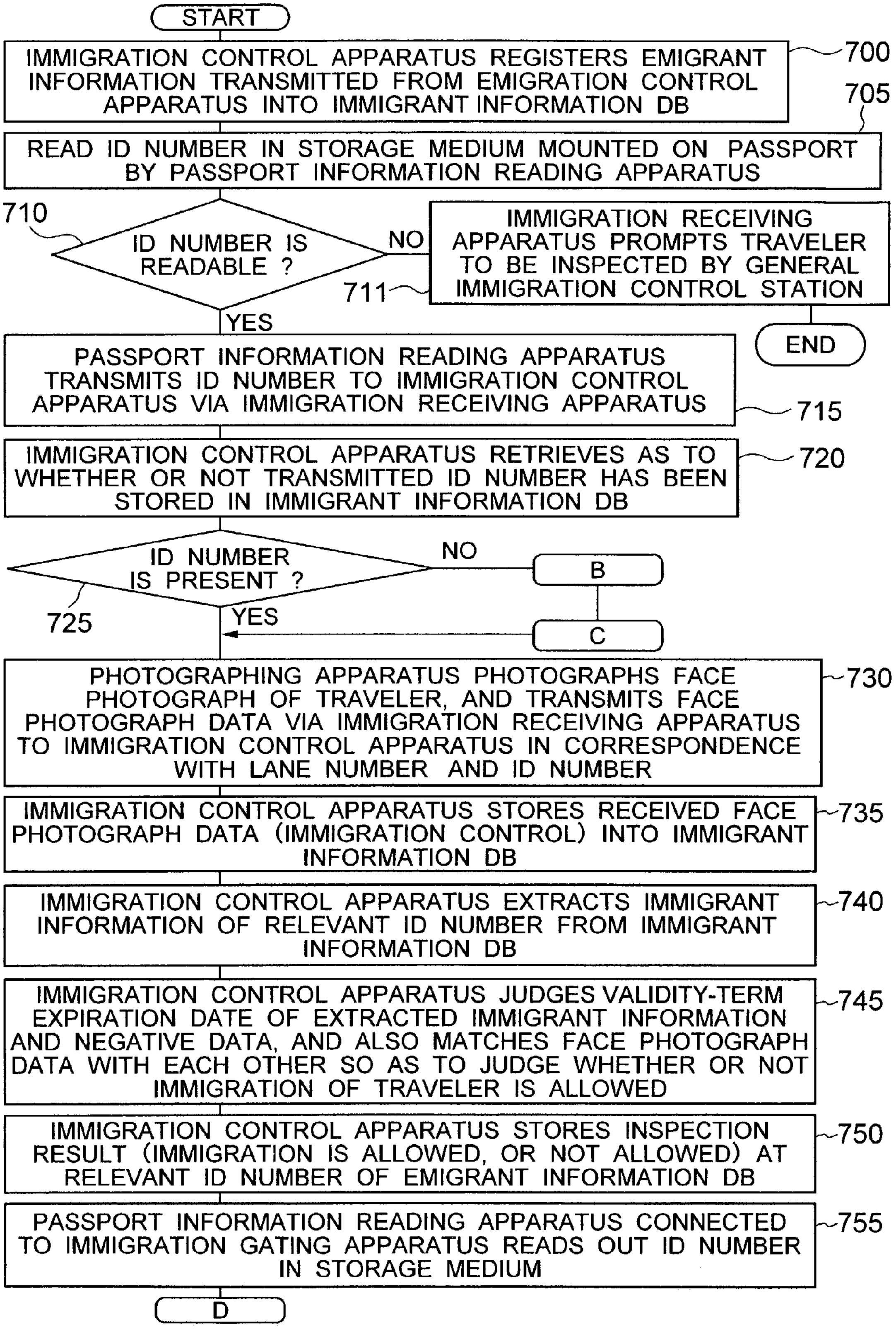
FIG. 9 is a flow chart for describing an immigration control process operation according to an embodiment of the present invention.
Figure 10:
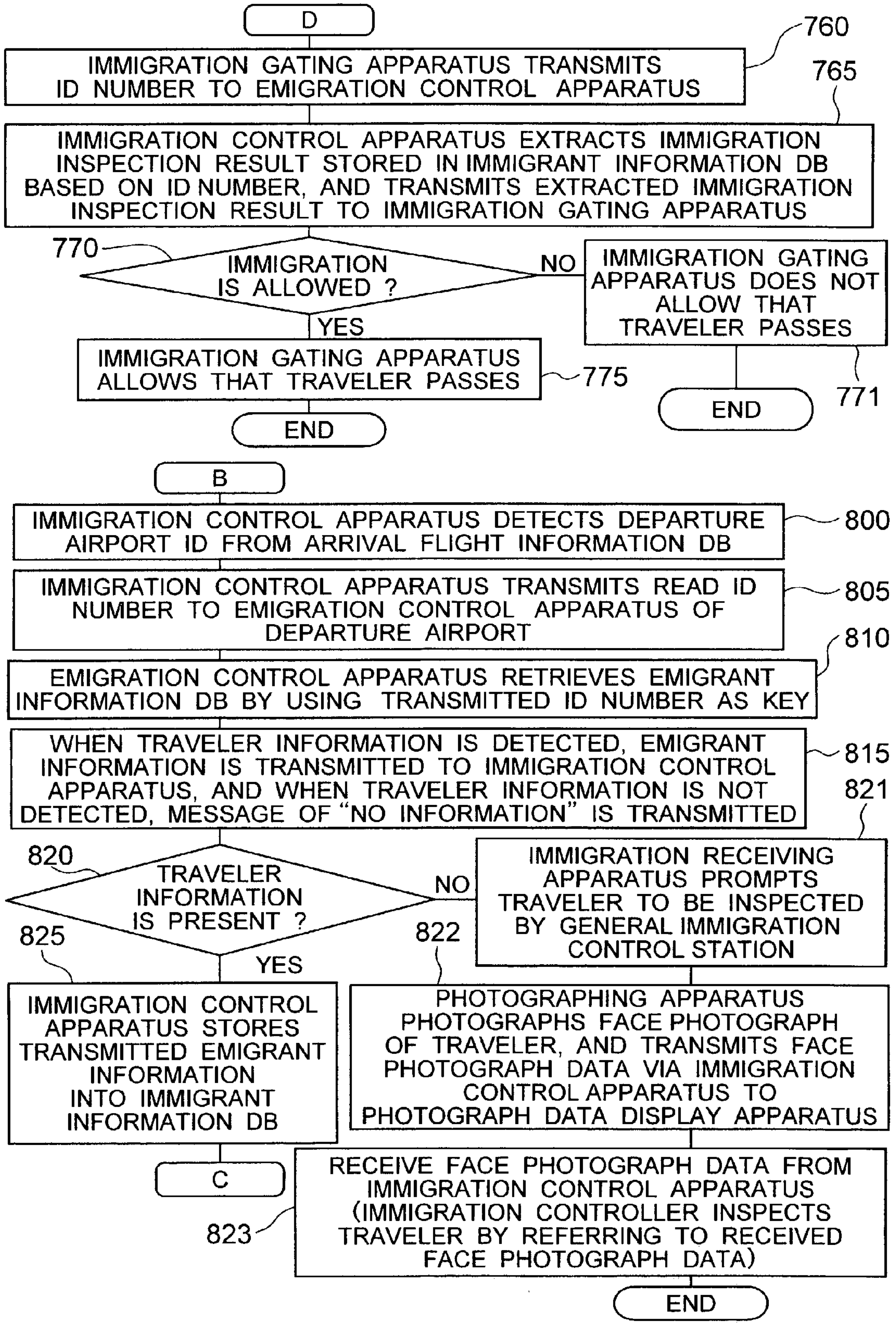
FIG. 10 is a flow chart for explaining a portion of the immigration control process operation according to the embodiment of the present invention.

Next, an immigration control process operation as to the traveler 140 in an immigrant-only control lane 210 will now be explained with reference to flow charts shown in FIG. 9 and FIG. 10, and the block diagram of FIG. 1, and further, the immigrant information DB 217 of FIG. 11 and the emigrant information DB 117 of FIG. 4, and also, the arrival flight information DB 216 of FIG. 12, if necessary. It should be understood that facility arranging images and the respective apparatus employed in this immigrant-only control lane 210 in the immigration reception operation are similar to those of FIG. 13 in the emigration reception operation, and therefore, the facilities and the respective apparatus related to the above-described emigration are similarly arranged. First of all, the immigration control apparatus 215 stores the emigrant information transmitted from the emigration control apparatus 115 into the immigrant information DB 217 (step 700). The traveler 140 who enters into the immigrant-only control lane 210 inserts the passport 150 into the passport information reading apparatus 211, or holds up this passport 150 to the passport information reading apparatus 211. As a result, the passport information reading apparatus 211 reads out an ID number of the storage medium 153 mounted on the passport 150 (step 705). When the ID number of the storage medium 153 cannot be read ("NO" in step 710), the immigration receiving apparatus 218 receives a notification from the passport information reading apparatus 211, and closes the gate, and then prompts the traveler 140 to go to the general immigration control station 220 (step 711). To the contrary, when the ID number can be read ("YES" in step 710), the passport information reading apparatus 211 transmits the read ID number to the immigration receiving apparatus 218. This immigration receiving apparatus 218 transmits the received ID number to the immigration control apparatus 215 (step 715). This immigration control apparatus 215 retrieves to confirm as to whether or not the received ID number has been stored in the immigrant information DB 217 (step 720). If the received ID number is not stored in this immigrant information DB 217 ("NO" in step 725), as indicated in a flow chart started from a step B of FIG. 10, then the immigration control apparatus 215 retrieves the flight name 910 of the arrival time 930 before a predetermined time range (for example, before 2 hours), while a present time instant is employed as a key as to the arrival flight information DB 216, and extracts a departure airport ID 920 (step 800). The immigration control apparatus 215 transmits the read ID number with respect to the respective emigration control apparatus 115 which correspond to all of the extracted departure airport IDs 920 in order to inquire as to whether or not the relevant ID number is registered (step 805). Each of the emigration control apparatus 115 which have received this inquiry retrieves the emigrant information DB 117, while the received ID number is used as a key (step 810). In the case that the traveler information is detected, the relevant traveler information is transmitted to the immigration control apparatus 215. To the contrary, in the case that the traveler information is not detected, such a message information "no traveler information" is returned to the immigration control apparatus 215. In the case that the traveler information is not detected ("NO" in step 820), as shown in FIG. 13, the immigration control apparatus 215 closes the gate, and prompts the traveler 140 to go to the general immigration control station 220 for immigration control (step 821). The photographing apparatus 212 photographs the face of the traveler 140, and then, transmits this image data (namely, face photograph data) from the immigration receiving apparatus 218 to the immigration control apparatus 215. This immigration control apparatus 215 transmits the received face photograph data to the face photograph data display apparatus 221 of the general immigration control station 220 (step 822). The face photograph data display apparatus 221 displays the face photograph data received in the step 822 on a display unit in response to an operation input of an immigration controller (step 823). To the contrary, in such a case that the traveler information is detected in each of the emigration control apparatus 115 and thus a message information "traveler information is present" is sent ("YES" in step 820), the immigration control apparatus 215 stores the received traveler information into the immigrant information DB 216 (step 825). Subsequently, the process operation is advanced to the process operation defined at the step 730.

On the other hand, in the case that the ID number has been stored in the immigrant information DB 217 ("YES" in step 725), the photographing apparatus 212 photographs the face of the traveler 140, and then, transmits the face photograph data to the immigration control apparatus 215 in correspondence with this ID number (step 730). The immigration control apparatus 215 stores the received face photograph data into the face photograph data (immigration control) 629 of the immigration information DB 217 (step 735). Subsequently, the immigration control apparatus 215 extracts the immigrant information 620 of this ID number 610 from the immigrant information DB 217 (step 700). The immigration control apparatus 215 executes a judging process operation of the validity-term expiration data 627 based upon the extracted immigrant information 620, and also executes a matching process operation as to both the face photograph data (emigration control) 628 and the face photograph data (immigration control) 629 by utilizing an image recognition, and thus, judges as to whether or not the immigration of the traveler 140 is allowed (step 745). At this time, in such a case that the matching process operation of the face photograph data can be technically difficult by using the image recognition, similar to the above-described emigration control process operation, since both the face photograph data (emigration control) and the face photograph data (immigration control) are displayed on the display unit of the immigration control apparatus 215 as represented by the screen image of FIG. 8, the immigration controller may artificially execute the face-photograph matching operation to enter a result of this artificial matching process operation. The immigration control apparatus 215 stores such an immigration control result 631 obtained in the above-described manner into a column of the immigrant information DB 217, corresponding to the relevant ID number (step 750).

Subsequently, the traveler 140 advances to the immigrant-only control lane 210, and then stops his walking at the immigrant gate apparatus 214. The traveler 140 inserts the passport 150 into the passport information reading apparatus 213, or holds up this passport 150 to the passport information reading apparatus 213 which is connected to the immigration gating apparatus 214. As a result, the passport information reading apparatus 213 reads out the ID number of the storage medium 153 of the passport 150 (step 755). As shown in a flow chart starting from a step D of FIG. 10, the immigration gating apparatus 214 transmits the read ID number to the immigration control apparatus 215 (step 760). The immigration control apparatus 215 extracts the immigration control result 631 stored in the immigrant information DB 217 from the transmitted ID number, and then, transmits the extracted immigration control result 631 to the immigration gating apparatus 214 (step 765). If the immigration of this traveler 140 is not allowed ("NO" in step 770), then the immigration gating apparatus 214 does not allow that this traveler 140 passes through this immigration gating apparatus 214 (step 771). To the contrary, in the case that the immigration of this traveler 140 is allowed ("YES" in step 770), then the immigration gating apparatus 214 allows that this traveler 140 can pass through the immigration gating apparatus 214 (step 775).

In connection to the above-described immigration control operation, a description will now be made of another immigration control method executed in the case that a traveler immigrates into a foreign country to which this traveler can go from the own country by land by way of not an airport, but a train, and/or an automobile with reference to the block diagram of FIG. 1. As a first initial condition, it is so assumed that when the passport 150 is issued, such a country code capable of discriminating a passport-issued country is contained in the ID number 310. When the traveler 140 immigrates into a foreign country, a passport information reading apparatus 211 which is installed in an immigration control station of this foreign country reads out the ID number 310 of the passport 150. The passport information reading apparatus 211 is connected to a relevant passport information managing apparatus 161 of a passport-issuing country as to this passport 150 based upon the country code of the read ID number, and then transmits this read ID number to this passport information managing apparatus 161. The passport information managing apparatus 161 detects the traveler owner information 320 stored in the passport information DB 162 based upon the received ID number, and then transmits the detected passport owner information 320 to the immigration control apparatus 215. The immigration control apparatus 215 transmits this received passport owner information 320 to the immigration receiving apparatus 218. Then, this immigration receiving apparatus 218 displays the received passport owner information 320 on a display unit equipped therewith. An immigration controller compares the displayed passport owner information 320 with both the description content 152 of the passport 150 owned by the traveler 140 and the face of the traveler 140 in order to judge as to whether or not the immigration of this traveler 140 is allowed.

It should be noted that the photographing apparatus 112 (photographing apparatus 212) and the emigration gating apparatus 114 (immigration gating apparatus 214) have been explained as the separated apparatus in this embodiment. Alternatively, both the photographing apparatus 112 and the emigration gating apparatus 114 may be combined with each other to constitute a single apparatus. In this alternative case, both the passport information reading apparatus 111 and 114 (namely, 211 and 214) may be constituted as a single passport information reading apparatus, and may be connected to the above-described combination apparatus. Also, in this embodiment, while the face photograph data is acquired by the above-described photographing apparatus, the traveler is identified based on this face photograph data. Alternatively, as another identification method, such an ecological identification as a finger print, a vein, and a retina may be carried out.

In the immigration apparatus according to this embodiment, both the ID number capable of identifying the person and the image data capable of specifying the person are transmitted to the emigration receiving apparatus 118. As a result, the image data photographed in the above-described manner may also be stored in a center, and the information which has been acquired in the inspection stages such as the face photograph data (emigration control) 428 photographed in the airport may also be utilized in the succeeding inspection stages, for example, an immigration inspection, and a re-entry inspection for an emigrant. That is, these information can be effectively utilized. In the case of re-entering of a traveler, for instance, in such a case that an emigrant who has emigrated from a country "A" into another country "B" re-enters from the country "B" into the above country "A", the face photograph data (emigration control) 428 photographed in the country "A" may be utilized in an immigration control operation executed in the country "A".

Next, a description will be made of an immigration control method in the case that a country as an emigration destination into which a traveler has firstly emigrated is different from another country as an emigration source into which this traveler reenters, for instance, a traveler who has emigrated from a country "A" enters into a country "B", and emigrates from this country "B" and then enters into another country "C", and further emigrates from the country "C", and thereafter enters into the country "A". For example, both the emigrant information acquired in the countries A, B, C, and the immigrant information sent to the respective countries are sequentially transmitted to the immigration country as the emigrant information in order to be utilized in the succeeding inspection stages. Alternatively, a check is made as to whether or not the traveler corresponds to a reentering person based upon the ID number on the side of immigration accepting country. If this traveler corresponds to the re-entering person, then the immigration control process operation may be carried out by utilizing the emigrant information acquired when the traveler emigrated from the country "A".

In accordance with this embodiment, since the emigration control apparatus transmits the emigrant information to the immigration control apparatus, the information as to the person the emigrates is matched with the information as to the person who immigrates, so that a check can be made as to whether or not such a person enters who is completely different from the person who should originally enter. This checking operation may be similarly applied to another process operation executed in the case that the emigrant again enters into the own country, namely returns to the own country.

In accordance with this embodiment, a person who owns such a passport 150 which is detected under such a fact that the storage medium 153 has been mounted thereon may be inspected by using the information stored in this storage medium 153 in the emigrant-only control lane 110. On the other hand, a person who owns such a passport 150 which is not detected under such a fact that the storage medium 153 has been mounted thereon may be inspected by the normal inspection, but not be inspected with utilizing the information of the storage medium 153. As a consequence, the person who owns the passport 150 which is detected under such a fact that the storage medium 153 has been mounted thereon can be more quickly inspected. On the other hand, there is no such a demerit. That is, any person may not be inspected due to such a reason that this person who owns the passport 150 which is not detected under such a fact that the storage medium 153 has been mounted thereon.

Although the storage medium 153 has been actually mounted, as to such a passport 150 which could not be detected under such a fact that this storage medium 153 has been mounted thereon, this passport 150 may be handled in a similar to the passport 150 on which the storage medium 153 is not mounted. This arrangement may absorb failures of the passport information reading apparatus 111.

In accordance with this embodiment, the following effects can be achieved. That is, every time the respective travelers are inspected by the immigration inspection, the following process operation is no longer required. Namely, in order to download the identification information, the immigration reception system need not be connected to the domestic and foreign passport managing systems via the communication network every one traveler. As a result, this embodiment never requires lengthy communication time which is required every time the emigration/immigration control operations are executed. As a consequence, the embodiment can solve the huge time loss problem which is caused by accumulating the communication time required for each of these travelers, so that the inspection operations can be very quickly carried out.

As previously explained, since the respective apparatus and the respective sub-systems, which are separately constituted depending upon the respective functions and the respective roles, are combined with each other in the organic manner, the immigration/emigration control (inspection) operations can be realized in precise and smooth manners.

Also, since the information as to the immigrants who take the same arrival flight, which has been acquired during the emigration control operation, is provided to the immigration control operation, illegal immigrants can be prevented.

While the ID number of the passport is employed as the key, various process operations can be executed with the immigration/emigration control systems, for instance, the various sorts of information and the various data can be read/written, can be transmitted/received, can be identified, and can be retrieved. As a result, the immigration/emigration control operations can be carried out in a high efficiency and in a smooth manner. In addition, even among the immigration/emigration control systems installed in the various countries, the various sorts of information and the various data can be identified with each other, while the ID number of the passport is employed as the key. As a result, the immigration/emigration system can be established in a world-wide scale in a higher efficiency and also a smooth manner.

Since various sorts of confirmation works required in the immigration/emigration control operations can be automatically carried out, these immigration/emigration control operations can be executed in the higher speeds and the higher efficiency. Also, remodeling and alternating of passports can be avoided, and also illegal uses of these remodeled/alternated passports can be prevented.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An emigration control-series system, comprising:

an emigration reception system including:

a first reading apparatus for reading, from a passport, passport-issue-allowed person specifying information which identifies the person who owns said passport, wherein said passport is equipped with a storage portion which stores data including at least said passport-issue-allowed person specifying information and a previously taken photograph of said person who owns said passport;

a photographing apparatus for photographing said person who presents said passport to said first reading apparatus when emigration processing of said person who presents said passport is initiated by said emigration reception system, to obtain an image which specifies said person who presents said passport to acquire person specifying image data; and a linking apparatus for linking said read passport-issue-allowed person specifying information to said acquired person specifying image data and outputting both said read passport-issue-allowed person specifying information and said acquired person specifying image data while said person who presented the passport proceeds to an emigration gate system;

an emigration control system, including:

a passport-issue-allowed person information storage apparatus for storing therein both information related to a passport-issue-allowed person and image data for specifying said passport-issue-allowed person, which are supplied from an external passport issuing institution via a communication network, in correspondence with passport-issue-allowed person specifying information which identifies said person who owns said passport;

an inputting apparatus for receiving and inputting both said acquired person specifying image data and said read passport-issue-allowed person specifying information output by said linking apparatus;

an emigrant information storage apparatus for storing thereinto said acquired person specifying image data in correspondence with said read passport-issue-allowed person specifying information input by said inputting apparatus;

an extracting apparatus for extracting both said supplied passport-issue-allowed person specifying image data and said supplied passport-issue-allowed person information, which are stored in said passport-issue-allowed person information storage apparatus based upon said read passport-issue-allowed person specifying information, and acquired person specifying image data stored in said emigrant information storage apparatus based upon said inputted passport-issue-allowed person specifying information;

an apparatus for identifying said extracted supplied passport-issue-allowed person specifying image data with respect to said extracted acquired person specifying image data;

an apparatus for judging legitimacy of said passport-issue-allowed person information extracted from said emigrant information storage apparatus; and an allowing/not-allowing apparatus for judging as to whether or not the emigration of the person presenting the passport to the first reading apparatus is allowed based upon a result of said identification and a result of said legitimacy judgment, wherein the judgment result is completed before the person who presented the passport arrives to the emigration gate system, wherein said emigrant information storage apparatus stores said judgment result; and wherein when said inputting apparatus inputs a request for said judgment result, the judgment result is retrieved from said emigrant information storage apparatus; and the emigration gate system, including:

a second reading apparatus for reading, from said passport, said passport-issue-allowed person specifying information which identifies said person who owns said passport;

an apparatus for inputting thereinto the judgment result of allowing/not allowing said emigration which is supplied from said emigration control system; and an apparatus for allowing or disallowing that said person who presents said passport passes through a gate in response to said acquired judgment result.

2. An emigration control method, comprising the steps of:

in an emigration reception system, reading from a passport, by a first reading apparatus, passport-issue-allowed person specifying information which identifies the person who owns said passport, wherein said passport is equipped with a storage portion which stores data including at least said passport-issue-allowed person specifying information and a previously taken photograph of said person who owns said passport;

photographing said person who presents said passport to said first reading apparatus when emigration processing of said person who presents said passport is initiated by said emigration reception system, to obtain an image which specifies said person who presents said passport to acquire person specifying image data; and linking, by a linking apparatus, said read passport-issue-allowed person specifying information to said acquired person specifying image data and outputting both said read passport-issue-allowed person specifying information and said acquired person specifying image data while said person who presented the passport proceeds to an emigration gate system, in an emigration control system, storing in a passport-issue-allowed person information storage apparatus, both information related to a passport-issue-allowed person and image data for specifying said passport-issue-allowed person, which are supplied from an external passport issuing institution via a communication network, in correspondence with passport-issue-allowed person specifying information which identifies said person who owns said passport;

inputting, into an inputting apparatus, both said acquired person specifying image data and said read passport-issue-allowed person specifying information output by said linking apparatus;

storing, in an emigrant information storage apparatus, said acquired person specifying image data in correspondence with said read passport-issue-allowed person specifying information input by said inputting apparatus;

extracting, by an extracting apparatus, both said supplied passport-issue-allowed person specifying image data and said supplied passport-issue-allowed person information, which are stored in said passport-issue-allowed person information storage apparatus based upon said read passport-issue-allowed person specifying information, and acquired person specifying image data stored in said emigrant information storage apparatus based upon said inputted passport-issue-allowed person specifying information;

identifying said extracted supplied passport-issue-allowed person specifying image data with respect to said extracted acquired person specifying image data;

judging legitimacy of said passport-issue-allowed person information extracted from said emigrant information storage apparatus; and judging as to whether or not the emigration of the person presenting the passport to the first reading apparatus is allowed based upon a result of said identification and a result of said legitimacy judgment, wherein the judgment result is completed before the person who presented the passport arrives to the emigration gate system, wherein said emigrant information storage apparatus stores said judgment result; and wherein when said inputting apparatus inputs a request for said judgment result, the judgment result is retrieved from said emigrant information storage apparatus; and in an emigration gate system, reading, from said passport by a second reading apparatus said passport-issue-allowed person specifying information which identifies said person who owns said passport;

inputting the judgment result of allowing/not allowing said emigration which is supplied from said emigration control system; and allowing or disallowing that said person who presents said passport passes through a gate in response to said acquired judgment result.

3. An immigration control-series system, comprising:

an immigration reception system, including:

a first reading apparatus for reading, from a passport, passport-issue-allowed person specifying information which identifies the person who owns said passport, while said passport is equipped with a storage portion which stores data including at least said passport-issue-allowed person specifying information and a previously taken photograph of said person who owns said passport;

a photographing apparatus for photographing said person who presents said passport, to said first reading apparatus when immigration processing of said person who presents said passport is initiated by said immigration reception system to obtain an image which specifies said person who presents said passport so as to acquire person specifying image data; and a linking apparatus for linking said read passport-issue-allowed person specifying information to said acquired person specifying image data and outputting both said read passport-issue-allowed person specifying information and said acquired person specifying image data while said person who presented the passport proceeds to an immigration gate system;

an immigration control system, including:

an immigrant information storage apparatus for storing therein both information related to a passport-issue-allowed person of an immigrant and image data for specifying said immigrant in corresponding relation to passport-issue-allowed person specifying information which identifies said person who owns a passport;

wherein said image data for specifying said immigrant was taken by photographing apparatus for photographing said person who presented said passport when emigration processing of said person who presented said passport is was initiated by said an emigration control system to obtain said image data, an entering apparatus for receiving and entering both said acquired person specifying image data and said read passport-issue-allowed person specifying information in linked corresponding relation therewith, output by said linking apparatus, so as to be stored into said immigrant information storage apparatus;

an extracting apparatus for extracting said immigrant specifying image data, said acquired person specifying image data, and said read passport-issue-allowed person specifying information stored in said immigrant information storage apparatus based upon said entered passport-issue-allowed person specifying information;

an apparatus for identifying said extracted immigrant specifying image data with respect to said extracted acquired holding-person specifying image data;

an apparatus for judging legitimacy of said passport-issue-allowed person information; and an apparatus for judging whether the immigration of said person presenting the passport is allowed based upon a result of said identification and a result of said legitimacy judgment, wherein information regarding said person who owns said passport is retrieved using said passport-issue-allowed person specifying information and wherein the judgment result is completed before the person who presented the passport arrives to the immigration gate system; and the immigration gate system, including:

a second reading apparatus for reading, from said passport, said passport-issue-allowed person specifying information which identifies said person who owns said passport;

an apparatus for acquiring the judgment result of allowing/not-allowing the immigration from said immigration control system, and an apparatus for allowing or disallowing that the person who presents the passport passes through the gate in response to said acquired judgment result.

4. An immigration method, comprising the steps of:

in an immigration reception system, reading from a passport, by a first reading apparatus, passport-issue-allowed person specifying information which identifies the person who owns said passport, while said passport is equipped with a storage portion which stores data including at least said passport-issue-allowed person specifying information and a previously taken photograph of said person who owns said passport;

photographing said person who presents said passport, to said first reading apparatus when immigration processing of said person who presents said passport is initiated by said immigration reception system to obtain an image which specifies said person who presents said passport so as to acquire person specifying image data; and linking, by a linking apparatus, said read passport-issue-allowed person specifying information to said acquired person specifying image data and outputting both said read passport-issue-allowed person specifying information and said acquired person specifying image data, while said person who presented the passport proceeds to an immigration gate system;

in an immigration control system, storing, in an immigrant information storage apparatus, both information related to a passport-issue-allowed person of an immigrant and image data for specifying said immigrant in corresponding relation to passport-issue-allowed person specifying information which identifies said person who owns a passport;

wherein said image data for specifying said immigrant was taken by photographing said person who presented said passport when emigration processing of said person who presented said passport was initiated by an emigration control system to obtain said image data, receiving and entering, by an entering apparatus, both said acquired person specifying image data and said read passport-issue-allowed person specifying information in linked corresponding relation therewith, output by said linking apparatus, so as to be stored into said immigrant information storage apparatus;

extracting, by an extracting apparatus, said immigrant specifying image data, said acquired person specifying image data, and said read passport-issue-allowed person specifying information stored in said immigrant information storage apparatus based upon said entered passport-issue-allowed person specifying information;

identifying said extracted immigrant specifying image data with respect to said extracted acquired holding-person specifying image data;

judging legitimacy of said passport-issue-allowed person information; and judging whether the immigration of said person presenting the passport is allowed based upon a result of said identification and a result of said legitimacy judgment, wherein information regarding said person who owns said passport is retrieved using said passport-issue-allowed person specifying information, and wherein the judgment result is completed before the person who presented the passport arrives to the immigration gate system; and in an immigration gate system, reading from said passport, by a second reading apparatus, said passport-issue-allowed person specifying information which identifies said person who owns said passport;

acquiring the judgment result of allowing/not-allowing the immigration from said immigration control system, and allowing or disallowing that the person who presents the passport passes through the gate in response to said acquired judgment result.

* * * * *